United States Patent [19]
Vanderhoof

[11] Patent Number: 5,997,073
[45] Date of Patent: Dec. 7, 1999

[54] RETRACTABLE DECK FOR RECREATIONAL VEHICLES

[76] Inventor: Elmer Vanderhoof, 145 NE. Jefferson, Hillsboro, Oreg. 97124

[21] Appl. No.: 09/061,205

[22] Filed: Apr. 16, 1998

[51] Int. Cl.$^6$ ........................................................ B60R 3/37
[52] U.S. Cl. ........................................ 296/162; 296/26.13
[58] Field of Search .................................. 296/162, 26.13

[56] References Cited

U.S. PATENT DOCUMENTS

| | | | |
|---|---|---|---|
| 4,883,306 | 11/1989 | Stucky | 296/162 |
| 5,899,518 | 5/1999 | Schreiner | 296/162 |

*Primary Examiner*—Gary C. Hoge

[57] ABSTRACT

A new retractable deck for recreational vehicles for providing a deck for use with recreational vehicles. The inventive device includes a plurality of sliding rails secured to an underside of a vehicle. The sliding rails each have an inner portion and an outer portion. The inner portion is secured to the underside of the vehicle. Each outer portion is slidably disposed within each inner portion. Free ends of each outer portion have a support leg pivotally secured thereto. The support leg is positioned interiorly of the outer portion in a retracted orientation and essentially perpendicular to the outer portion in an extended orientation. A deck portion is removably securable to and extends across the plurality of sliding rails.

6 Claims, 2 Drawing Sheets

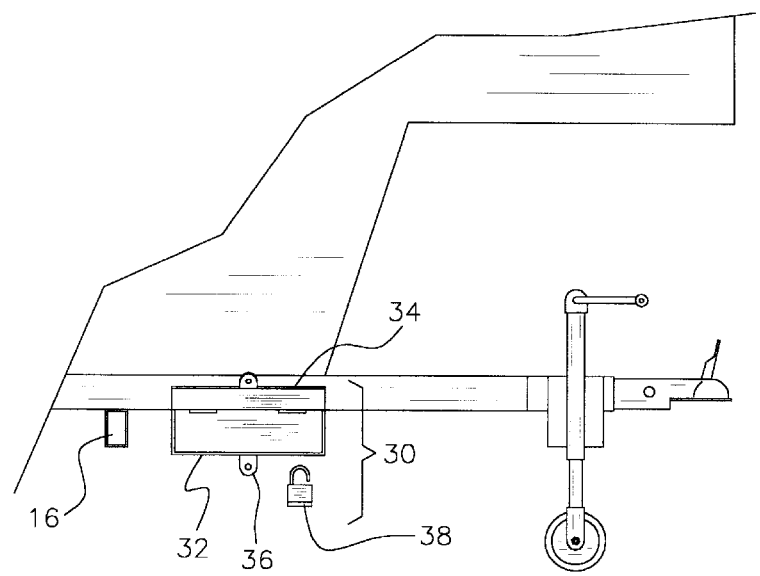
Fig. 4
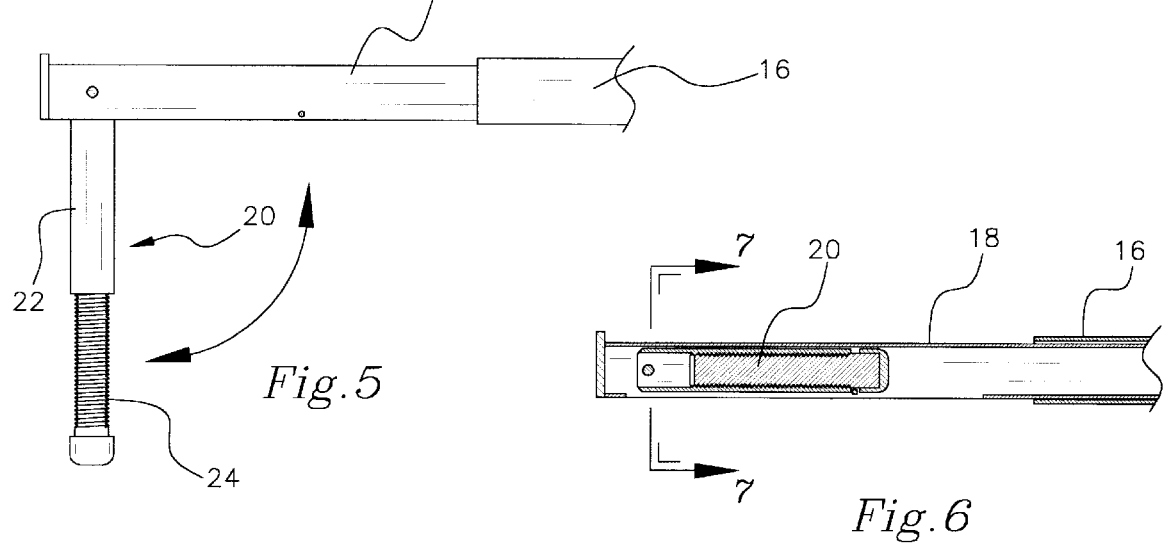
Fig. 5
Fig. 6
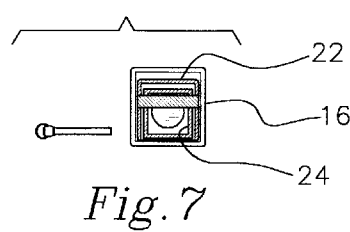
Fig. 7

RETRACTABLE DECK FOR RECREATIONAL VEHICLES

BACKGROUND OF THE INVENTION

1. Field of the Invention

The present invention relates to decks and more particularly pertains to a new retractable deck for recreational vehicles for providing a deck for use with recreational vehicles.

2. Description of the Prior Art

The use of decks is known in the prior art. More specifically, decks heretofore devised and utilized are known to consist basically of familiar, expected and obvious structural configurations, notwithstanding the myriad of designs encompassed by the crowded prior art which have been developed for the fulfillment of countless objectives and requirements.

Known prior art decks include U.S. Pat. No. 5,193,878 to Weaver; U.S. Pat. No. 4,883,306 to Stucky; U.S. Pat. No. 5,417,468 to Baumgartner et al.; U.S. Pat. No. 4,413,855 to Flanagan; U.S. Pat. No. 4,188,057 to Pauli; and U.S. Pat. No. Des. 341,340 to Pothering et al.

While these devices fulfill their respective, particular objectives and requirements, the aforementioned patents do not disclose a new retractable deck for recreational vehicles. The inventive device includes a plurality of sliding rails secured to an underside of a vehicle. The sliding rails each have an inner portion and an outer portion. The inner portion is secured to the underside of the vehicle. Each outer portion is slidably disposed within each inner portion. Free ends of each outer portion have a support leg pivotally secured thereto. The support leg is positioned interiorly of the outer portion in a retracted orientation and essentially perpendicular to the outer portion in an extended orientation. A deck portion is removably securable to and extends across the plurality of sliding rails.

In these respects, the retractable deck for recreational vehicles according to the present invention substantially departs from the conventional concepts and designs of the prior art, and in so doing provides an apparatus primarily developed for the purpose of providing a deck for use with recreational vehicles.

SUMMARY OF THE INVENTION

In view of the foregoing disadvantages inherent in the known types of decks now present in the prior art, the present invention provides a new retractable deck for recreational vehicles construction wherein the same can be utilized for providing a deck for use with recreational vehicles.

The general purpose of the present invention, which will be described subsequently in greater detail, is to provide a new retractable deck for recreational vehicles apparatus and method which has many of the advantages of the decks mentioned heretofore and many novel features that result in a new retractable deck for recreational vehicles which is not anticipated, rendered obvious, suggested, or even implied by any of the prior art decks, either alone or in any combination thereof.

To attain this, the present invention generally comprises three sliding rails secured to an underside of a recreational vehicle. The three sliding rails each have an inner portion and an outer portion. The inner portion is secured to the underside of the recreational vehicle. Each outer portion is slidably disposed within each inner portion. Free ends of each outer portion have a support leg pivotally secured thereto. The support leg is positioned interiorly of the outer portion in a retracted orientation and essentially perpendicular to the outer portion in an extended orientation. Each support leg has an upper portion and a lower portion. The lower portion is adjustably coupled with respect to the upper portion. A deck portion is removably securable to and extends across the three sliding rails. The deck portion is comprised of a plurality of elongated rectangular panels. A locking device is secured to the underside of the recreational vehicle. The locking device includes a container portion dimensioned for receiving the panels of the deck portion therein. The locking device includes a cover portion for slidably coupling with an open outer end of the container portion. The container portion and the cover portion include corresponding tabs for receiving a pad lock for locking the cover portion in a closed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retractable deck for recreational vehicles apparatus and method which has many of the advantages of the decks mentioned heretofore and many novel features that result in a new retractable deck for recreational vehicles which is not anticipated, rendered obvious, suggested, or even implied by any of the prior art decks, either alone or in any combination thereof.

It is another object of the present invention to provide a new retractable deck for recreational vehicles which may be easily and efficiently manufactured and marketed.

It is a further object of the present invention to provide a new retractable deck for recreational vehicles which is of a durable and reliable construction.

An even further object of the present invention is to provide a new retractable deck for recreational vehicles which is susceptible of a low cost of manufacture with regard to both materials and labor, and which accordingly is then susceptible of low prices of sale to the consuming public, thereby making such retractable deck for recreational vehicles economically available to the buying public.

Still yet another object of the present invention is to provide a new retractable deck for recreational vehicles which provides in the apparatuses and methods of the prior art some of the advantages thereof, while simultaneously overcoming some of the disadvantages normally associated therewith.

Still another object of the present invention is to provide a new retractable deck for recreational vehicles for providing a deck for use with recreational vehicles.

Yet another object of the present invention is to provide a new retractable deck for recreational vehicles Which includes a plurality of sliding rails secured to an underside of a vehicle. The sliding rails each have an inner portion and an outer portion. The inner portion is secured to the underside of the vehicle. Each outer portion is slidably disposed within each inner portion. Free ends of each outer portion have a support leg pivotally secured thereto. The support leg is positioned interiorly of the outer portion in a retracted orientation and essentially perpendicular to the outer portion in an extended orientation. A deck portion is removably securable to and extends across the plurality of sliding rails.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a side view of the present invention illustrating the locking device thereof.

FIG. 5 is a side view of one of the support legs of the present invention.

FIG. 6 is a cross-sectional view of one of the support legs of the present invention.

FIG. 7 is a cross-sectional view of the present invention as taken along line 7—7 of FIG. 6.

DESCRIPTION OF THE PREFERRED EMBODIMENT

Figure 1:
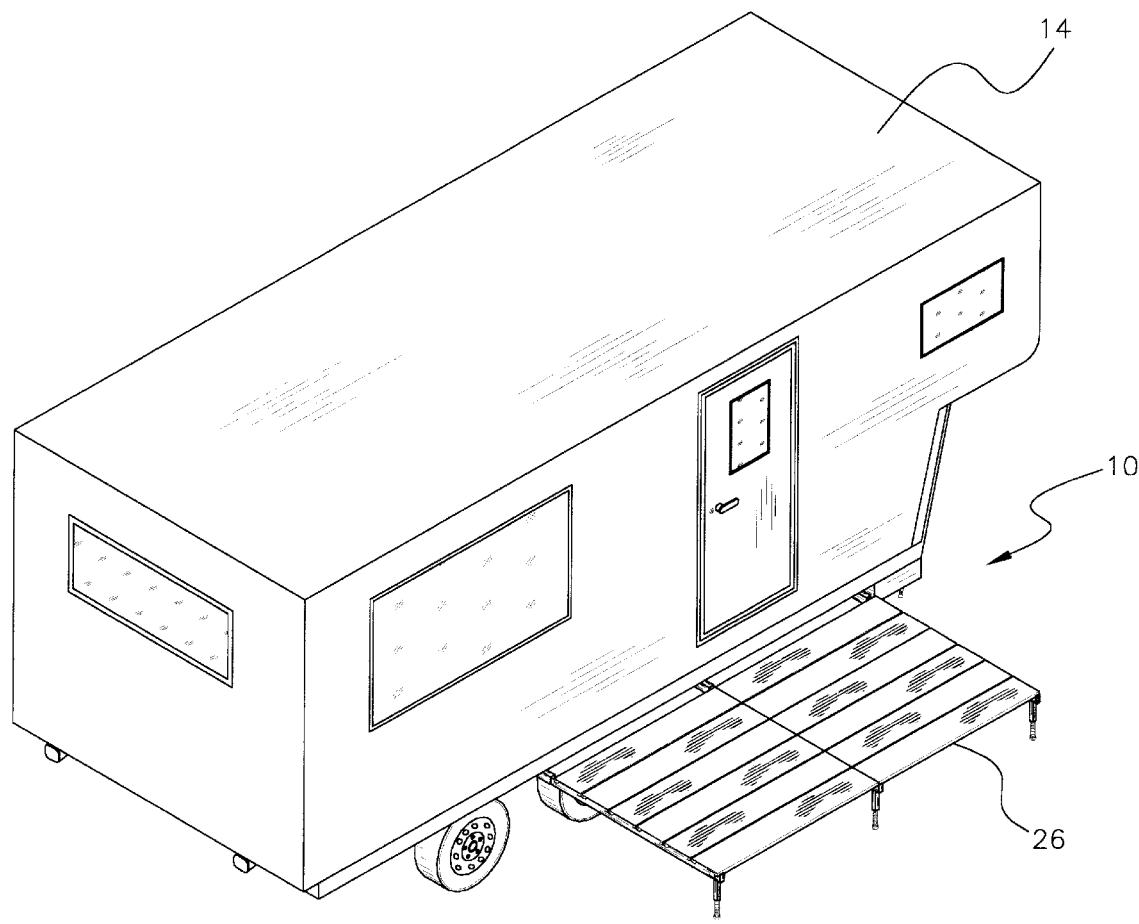
FIG. 1 is a perspective view of a new retractable deck for recreational vehicles according to the present invention.
Figure 2:
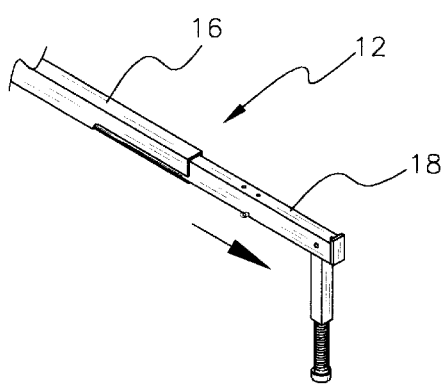
FIG. 2 is a perspective view of the sliding rails of the present invention.
Figure 3:
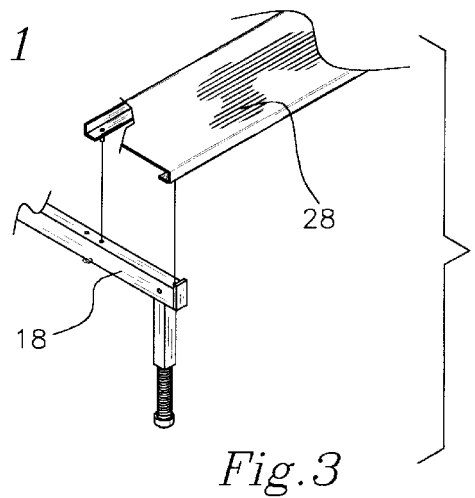
FIG. 3 is a perspective view of the sliding rail as attached to one of the panels of the present invention.

With reference now to the drawings, and in particular to FIGS. 1 through 7 thereof, a new retractable deck for recreational vehicles embodying the principles and concepts of the present invention and generally designated by the reference numeral 10 will be described.

As best illustrated in FIGS. 1 through 7, the retractable deck for recreational vehicles 10 comprises three sliding rails 12 secured to an underside of a recreational vehicle 14. The rails could be secured to other types of vehicles. The three sliding rails 12 each have an inner portion 16 and an outer portion 18. The inner portion 16 is secured to the underside of the recreational vehicle 14. Each outer portion 18 is slidably disposed within each inner portion 16. Free ends of each outer portion 18 have a support leg 20 pivotally secured thereto. The support leg 20 is positioned interiorly of the outer portion 18 in a retracted orientation and essentially perpendicular to the outer portion 18 in an extended orientation. Each support leg 20 has an upper portion 22 and a lower portion 24. The lower portion 24 is adjustably coupled with respect to the upper portion 22. The lower portions 24 can be adjusted to accommodate uneven ground to ensure that the device 10 is level. Additional sliding rails 12 could be used to create a larger version of the device 10.

A deck portion 26 is removably securable to and extends across the three sliding rails 12. The deck portion 26 is comprised of a plurality of elongated rectangular panels 28.

A locking device 30 is secured to the underside of the recreational vehicle 14. The locking device 30 includes a container portion 32 dimensioned for receiving the panels 28 of the deck portion 26 therein. The locking device 30 includes a cover portion 34 for slidably coupling with an open outer end of the container portion 32. The container portion 32 and the cover portion 34 include corresponding tabs 36 for receiving a pad lock 38 for locking the cover portion 34 in a closed position.

In use, once the recreational or other vehicle is parked at a camp site or the like, the three sliding rails 12 are extended and the support legs 20 are extended to support the sliding rails 12 and the deck portion 26 is removed from the locking device 30. The deck portion 26 would be secured atop the sliding rails 12. Once the deck portion 26 is secured, the user can place chairs and other items on the device 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new retractable deck for recreational vehicles for providing a deck for use with recreational vehicles comprising, in combination:

three sliding rails secured to an underside of a recreational vehicle, the three sliding rails each having an inner portion and an outer portion, the inner portion being secured to the underside of the recreational vehicle, each outer portion being slidably disposed within each inner portion, free ends of each outer portion having a support leg pivotally secured thereto, the support leg being positioned interiorly of the outer portion in a retracted orientation and essentially perpendicular to the outer portion in an extended orientation, each support leg having an upper portion and a lower portion, the lower portion being adjustably coupled with respect to the upper portion;

a deck portion being removably securable to and extending across the three sliding rails, the deck portion being comprised of a plurality of elongated rectangular panels;

a locking device secured to the underside of the recreational vehicle, the locking device including a container portion dimensioned for receiving the panels of the deck portion therein, the locking device including a cover portion for slidably coupling with an open outer end of the container portion, the container portion and the cover portion including corresponding tabs for receiving a pad lock for locking the cover portion in a closed position.

2. A new retractable deck for vehicles for providing a deck for use with vehicles comprising, in combination:

a plurality of sliding rails secured to an underside of a vehicle, the sliding rails each having an inner portion and an outer portion, the inner portion being secured to the underside of the vehicle, each outer portion being slidably disposed within each inner portion, free ends of each outer portion having a support leg pivotally secured thereto, the support leg being positioned interiorly of the outer portion in a retracted orientation and essentially perpendicular to the outer portion in an extended orientation;

a deck portion being removably securable to and extending across the plurality of sliding rails.

3. The retractable deck for vehicles as set forth in claim 2 wherein each support leg has an upper portion and a lower portion, the lower portion being adjustably coupled with respect to the upper portion.

4. The retractable deck for vehicles as set forth in claim 2 wherein the deck portion is comprised of a plurality of elongated rectangular panels.

5. The retractable deck for vehicles as set forth in claim 2 and further including a locking device secured to the underside of the recreational vehicle.

6. The retractable deck for vehicles as set forth in claim 5 wherein the locking device includes a container portion dimensioned for receiving the deck portion therein, the locking device including a cover portion for slidably coupling with an open outer end of the container portion, the container portion and the cover portion including corresponding tabs for receiving a pad lock for locking the cover portion in a closed position.

* * * * *